United States Patent
Shah et al.

(10) Patent No.: US 10,489,356 B1
(45) Date of Patent: Nov. 26, 2019

(54) TRUNCATE AND APPEND DATABASE OPERATION

(71) Applicant: Amazon Technologies, Inc., Seattle, WA (US)

(72) Inventors: Mehul A. Shah, Saratoga, CA (US); Anurag Windlass Gupta, Atherton, CA (US); Stavros Harizopoulos, San Francisco, CA (US); Nathan Binkert, Redwood City, CA (US); Benjamin Albert Sowell, Mountain View, CA (US); Zhuzeng Lu, Mountain View, CA (US); Carlos Garcia-Alvarado, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 15/384,138

(22) Filed: Dec. 19, 2016

(51) Int. Cl.
*G06F 16/21* (2019.01)
*G06F 16/22* (2019.01)
*G06F 16/23* (2019.01)

(52) U.S. Cl.
CPC .......... *G06F 16/211* (2019.01); *G06F 16/221* (2019.01); *G06F 16/2282* (2019.01); *G06F 16/2365* (2019.01); *G06F 16/2379* (2019.01)

(58) Field of Classification Search
CPC combination set(s) only.
See application file for complete search history.

(56) References Cited

U.S. PATENT DOCUMENTS

| | | | | |
|---|---|---|---|---|
| 5,651,127 A | * | 7/1997 | Gove | G06F 9/345 711/1 |
| 6,112,286 A | * | 8/2000 | Schimmel | G06F 12/1018 711/203 |
| 6,151,608 A | * | 11/2000 | Abrams | G06F 16/214 707/679 |
| 6,397,227 B1 | * | 5/2002 | Klein | G06F 16/2379 |
| 6,584,453 B1 | * | 6/2003 | Kaplan | G06Q 20/10 705/30 |
| 6,631,374 B1 | * | 10/2003 | Klein | G06F 16/2477 707/638 |
| 8,402,001 B1 | * | 3/2013 | Tovo | G06F 16/113 707/682 |
| 8,489,930 B1 | * | 7/2013 | Sim-Tang | G06F 16/211 714/38.1 |
| 10,083,206 B2 | * | 9/2018 | Zaidi | G06F 16/2428 |
| 10,157,214 B1 | * | 12/2018 | Abuomar et al. | G06F 16/2365 |
| 2008/0307255 A1 | * | 12/2008 | Chen | G06F 11/1471 714/13 |

(Continued)

*Primary Examiner* — Cam Linh T Nguyen
(74) *Attorney, Agent, or Firm* — Davis Wright Tremaine LLP

(57) ABSTRACT

A first column of a first database table may be transferred to a second table in a combined truncate and append operation in a transaction that may be atomic and reversible. References data for the first column may be removed from the first table and added to the second table. The combined operation may be reversed by removing, from the second table, references to blocks of data added to the second table prior to commencing the combined operation. A second column corresponding on a row-by-row basis to the first column may be added to the second table, where the data is indicative of visibility of data in the first column to other transactions on the second table.

20 Claims, 13 Drawing Sheets

(56) References Cited

U.S. PATENT DOCUMENTS

| | | | |
|---|---|---|---|
| 2010/0080587 A1* | 4/2010 | Booth | G03G 15/0266 399/44 |
| 2013/0212068 A1* | 8/2013 | Talius | G06F 16/1734 707/639 |
| 2013/0339398 A1* | 12/2013 | Griggs | G06F 16/23 707/803 |
| 2013/0339399 A1* | 12/2013 | Dorris | G06F 16/213 707/803 |
| 2014/0304234 A1* | 10/2014 | Hegde | G06F 16/219 707/661 |
| 2015/0248403 A1* | 9/2015 | Pazdziora | G06F 16/211 707/809 |
| 2016/0378674 A1* | 12/2016 | Cheng | G06F 12/1009 711/206 |
| 2017/0024382 A1* | 1/2017 | Bester | G06F 16/2282 |
| 2017/0249375 A1* | 8/2017 | Dembla | G06F 16/217 |
| 2018/0137175 A1* | 5/2018 | Teodorescu | G06F 16/221 |

\* cited by examiner

TRUNCATE AND APPEND DATABASE OPERATION

BACKGROUND

Increasingly, data warehouses maintain large and ever-increasing quantities of data. Extract, transform, and load ("ETL") workflows may be used to load data into a data warehouse. An ETL workflow may include steps for extracting data from a number of sources, loading the data into a pre-production table, transforming the data into a desired format, and copying the data from the pre-production table into a production table. End-users and client applications may then access the cleaned-up data in the production table. For various reasons, an ETL workflow may be costly in terms of the time and computing resources expended to complete the workflow. One aspect of this cost involves the efficiency of copying data between database tables.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
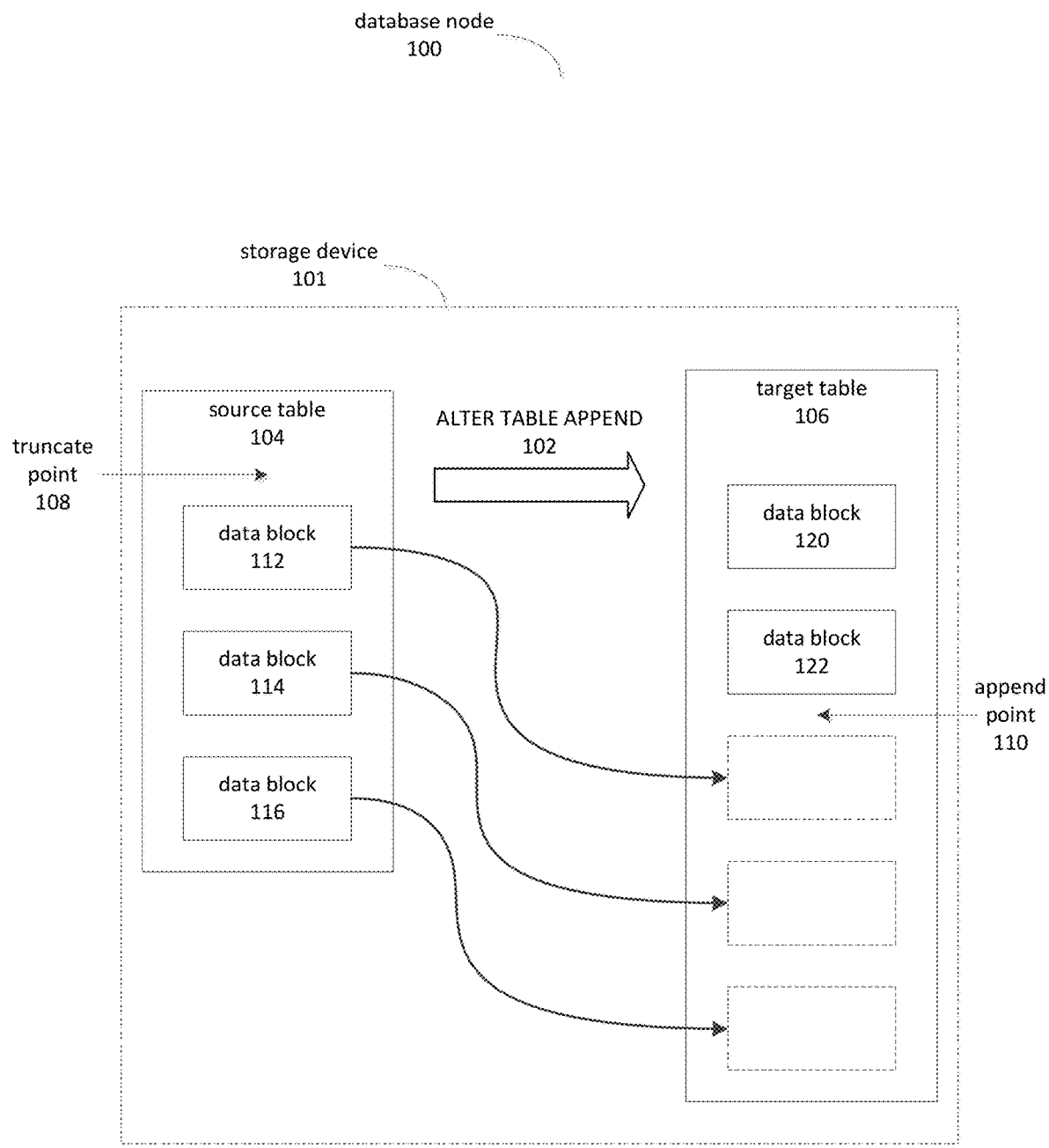
FIG. 1 is a block diagram depicting a command for transferring data between tables of a database node.

Disclosed herein are systems, methods, and computer program products pertaining to the transfer of data between tables in a database. In one embodiment, a database system may provide support for a command for performing a combined truncate and append operation in which data is removed from a source table and added to a destination table in an operation that may be both atomic and reversible.

In one embodiment, the database system may response to a command to transfer column data from a source table to a target table. The system may transfer the data between the two tables by adjusting references to blocks of column data, and thus may avoid copying of the column data. The system may remove references to blocks of column data from the source table, and add corresponding references to the blocks of column data to the target table. These steps may, in effect, truncate data from the first table and append the corresponding data to the second table, without copying the data.

In one embodiment, the system may also reverse the command by adding the references to the blocks of column data back into the first table, and removing the references to the blocks of column data from the second table. The command may be reversed for various reasons, including rollback of a transaction in which the command is executed.

In one embodiment, the combined truncate and append operation may be used in conjunction with an ETL workflow. A typical ETL workflow may comprise various stages. These stages may include loading data from a number of sources into a temporary or "pre-production" database table. During the loading, or subsequent to it, the data may be cleaned or transformed into a desired format. For example, the data might be cleaned so that addresses, street names, and phone numbers are represented in a standardized format. In some instances, duplicate entries might be identified and deleted. Once this stage has been completed, the data might then be transferred from the pre-production table into a "production" table, where it may be accessed by various end-users and client applications. Examples of these applications include, but are not limited to, report generators, online analytical processing ("OLAP") applications, and so forth. Once the data has been transferred from the pre-production table to the production table, the pre-production table may be dropped or truncated.

In one embodiment, a combined truncate and append operation may be executed to transfer data, without copying, from a pre-production table to a production table. More generally, a database executing the combined truncate and append operation may reassign data blocks initially associated with a source table to a target table, without copying those data blocks. In so doing, the source table may be effectively truncated. The effect on the target table, meanwhile, is that of an append operation since the reassigned data blocks are now associated with the target table, along with any data blocks that were already associated with it.

In one embodiment, the combined truncate and append is logically similar to a combination of a "SELECT INTO" statement to transfer data from the source table to the target table, followed by a TRUNCATE operation on the source table. However, a SELECT INTO statement typically involves copying of data from the source table to the target table. Furthermore, the TRUNCATE statement is typically non-transactional.

In one embodiment, a combined truncate and append operation may avoid copying of the underlying data, perform functions logically similar to a sequence of "SELECT INTO" and "TRUNCATE" in an atomic operation, and support transactions. The atomicity of the operation refers to the property of the combined operation of either successfully completing the operation or, in the event of a failure, cancellation, or rollback, having no permanent effect on the state of the data. For example, if a combined truncate and append operation failed during the append step, the effects of both the truncate and the append operation would be fully reversed as a consequence of the database's support for the operation's atomicity.

In one embodiment, transaction support may include rollback of a combined truncate and append operation and, in some cases, rollback of the effects of additional operations. The additional operations may be data modification language ("DML") commands including INSERT, UPDATE, and DELETE commands. In some cases, multiple combined truncate and append operations may also be included in a single transaction.

In one embodiment, a database supporting a combined truncate and append operation may support concurrent access to the transferred data. This may be referred to as multi-version concurrency control ("MVCC"). In an embodiment, a system supporting MVCC may respond to a command to perform a combined truncate and append operation by forming a staging table comprising one or more columns of data that correspond, on a row-by-row basis, to the data that is be transferred from a source table to a destination table. The staging columns may be stored, on a storage device, in blocks of data that correspond to the blocks of data that are to be transferred from the source table to the destination table. For example, a first set of one or more blocks of data might contain rows of data for a first column of a source table. The staging table might contain a second set of one or more blocks corresponding, on a row-by-row basis, to the first column. The second one or more blocks may comprise information indicative of the visibility, sometimes referred to as accessibility, of data in the first column to operations performed on the target table. This information may, for example, comprise a transaction sequence number. The transaction sequence number may correspond to a single, virtual transaction in which the rows from the source table were transferred to the target table. When modifying the target table to incorporate the rows from the first column, the system may further modify the target table to incorporate the corresponding rows from the staging table.

In one embodiment, the combined truncate and append operation, and its associated query language representation, may support options for handling schema discrepancies between the source table and target table. Examples of such discrepancies include a column being defined in the source table but not in the target table, or a column being defined in the target table but not in the source table. Embodiments may support execution of the combined truncate and append operation when such discrepancies exist, and provide various options for handling them, such as inserting default data values, ignoring extra data, and so on. This support may, moreover, be provided while maintaining the atomicity and reversibility of the combined append and truncate operation.

FIG. 1 is a block diagram depicting a command for transferring data between tables of a database node. In one embodiment, a database node 100 may comprise a storage device 101 on which data for a source table 104 and a target table 106 is stored. Although FIG. 1 depicts a single storage device, embodiments may in some instance employ multiple storage devices. Embodiments may perform combined truncate and append operations by employing reassignment of references to data blocks. In some instances, the data blocks whose references are reassigned may be stored on a number of storage devices. After the reassignment, the locations of the data blocks may remain the same while references to the data blocks have been relocated from a source table to a target table.

In one embodiment, the source table 104 may comprise columns of data stored as data blocks 112-116. A data block may comprise a subset of the data associated with the table. The data blocks may be referred to as column data, or as blocks of column data. For example, the data blocks 112-116 of the source table 104 may each contain a subset of the data for a column of the source table 104. Likewise, the data blocks 120-122 of the target table 106 may each contain a subset of the data for a column of the target table 106.

In one embodiment, a data block 112-116 may refer to a unit of storage on which data for the database node 100 is maintained on the storage device 101. In some instances, a data block (or, equivalently a block of column data) may refer to the lowest level of granularity with which data is stored on the storage device 101. In other instances, a data block may refer to higher levels of granularity. A data block may, for example, include a unit of storage to which a table maintains references that may be reassigned.

In one embodiment, the data blocks 112-116 of the source table 104 may, in some embodiments, be maintained on a storage device in a list, b-tree, or other structure having suitably efficient storage and retrieval properties. The source table 104 may comprise references to the data blocks 112-116 that may be used to facilitate access to the data maintained in the data blocks 112-116.

In one embodiment, the source table 104 may comprise a list, for each column of the source table 104, of data block identifiers. The data block identifiers may identify the data blocks which contain the data for the corresponding column. These embodiments may be described as employing a column-centric storage format.

In one embodiment, the source table 104 may comprise a list of blocks of data, each containing data for a subset of the rows of the source table. These embodiments may be described as employing a row-centric storage format. The various techniques described herein are applicable to column-centric and row-centric formats. References herein to column data, and to blocks of column data, may be applied to row-centric formats. Generally speaking, blocks of column data in a row-centric system may comprise data for multiple columns, rather than for an individual column as is typically the case in column-centric storage formats.

In one embodiment, the source table 104 may comprise identifiers, links, offsets, or other information which refers to data blocks. An identifier may be a numeric or textual value which may be used to locate, access, and store a block of column data. A link may refer to a pointer to a location in a memory or on a storage device. An offset may refer to a distance, in a memory or storage device, from another location. In some instances, identifiers, links, and/or offsets may be used in combination.

In one embodiment, a reference to a data block may comprise identifiers, links, and offsets individually or in combination. A reference may, accordingly, be used to locate, access, and/or store a data block. A table, such as the target table 106, may comprise references to data blocks, such as the depicted data blocks.

In one embodiment, the target table 106 may comprise data blocks 120-122 having a structure comparable to or compatible with that of the data blocks 112-116 of the source table 104. For example, the source table 104 might comprise a column $C_1$ and a reference to the data blocks 112-116 that contain the data for the column $C_1$. The target table 106 might also contain a corresponding column $C_1$, and comprise a reference to the data blocks 120-122.

Various operations, such as those related to ETL, may involve populating the target table 106 with data that is staged in the source table 104. For example, a system administrator might initiate a command to cause the data in column $C_1$ of the source table 104 to be appended to the data in column $C_1$ of the target table 106, and to truncate the source table 104 once the data in column $C_1$ has been transferred to the target table 106.

In one embodiment, a command 102, which may for example be represented by an "ALTER TABLE APPEND" expression, may request that that data be moved from the source table 104 to the target table 106, such that subsequent to the operation, the data specified by the command 102 has been removed from the source table 104 and added to the target table 106.

Execution of the command 102 may, in an embodiment, involve minimal copying of the underlying data. As depicted in FIG. 1, the target table 106 may, at the end of the operation, comprise its original data blocks 120-122 and the data blocks 112-116 from the source table 104 appended to the table after the append point 110. Similarly, the data blocks 112-116 may have been truncated after the truncate point 108. The truncation and appending operations may be made, in various embodiments, by removing references to the data blocks 112-116 from the source table 104 and adding references to the data blocks 112-116 to the source table 106.

In one embodiment, the command 102 may be an atomic operation. The command 102 may therefore be executed such that either the command 102 is successfully performed in its entirety, or has no permanent effect on the state of the database node 100.

In one embodiment, the command 102 may be executed in the context of a transaction, such that the command 102 and other commands, including another ALTER TABLE APPEND, which are included in the context of the transaction may be successfully performed in their entirety or have no permanent effect on the state of the database node 100.

Figure 2:
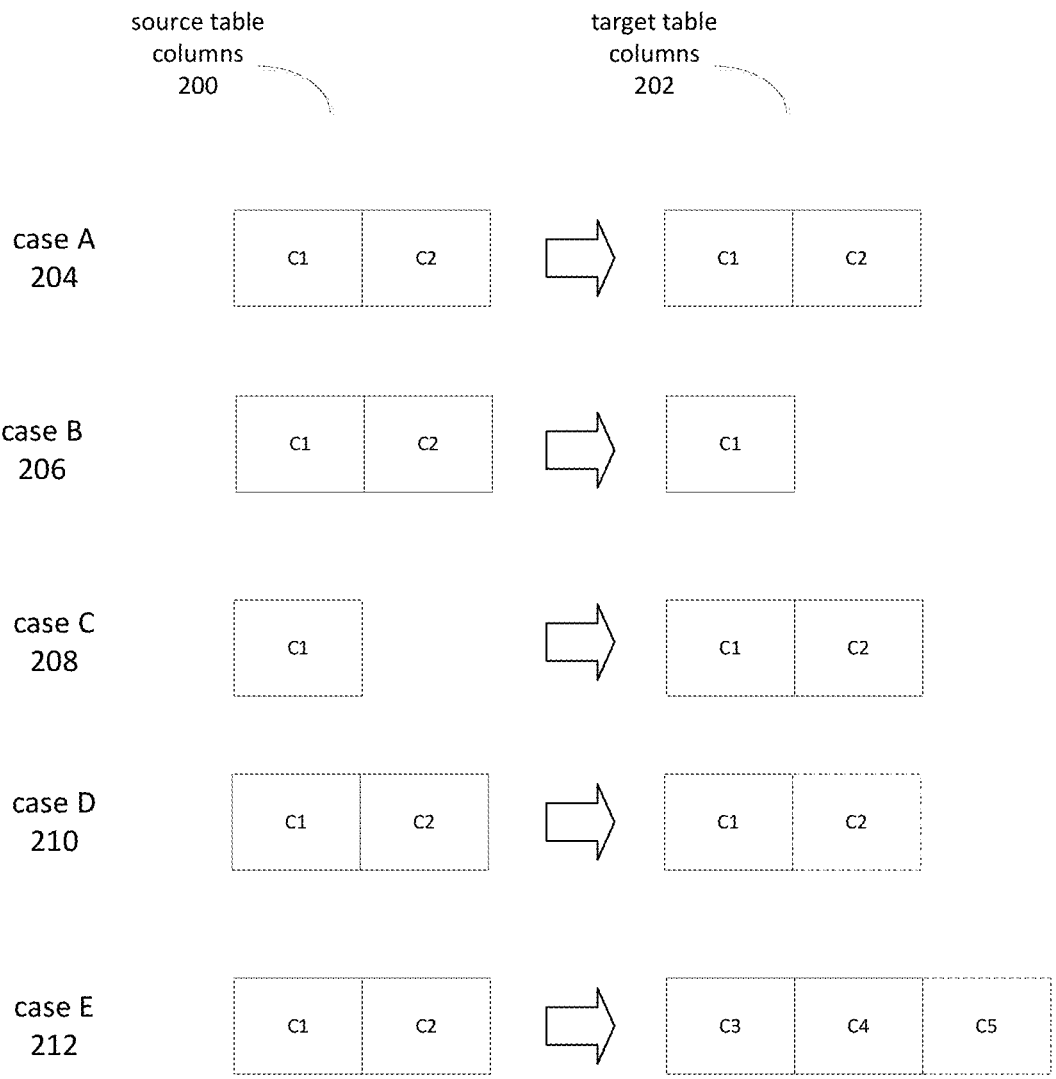
FIG. 2 is a block diagram depicting schema discrepancies between a source and target table.

In one embodiment, the alter table command may have syntax similar to 'ALTER TABLE <source table> APPEND FROM <target table> [options]." Here, "[options]" may represent instructions for handling schema discrepancies between the source and target tables of the ALTER TABLE APPEND command. FIG. 2 is a block diagram depicting schema discrepancies between a source 200 and a target table 202. Examples of discrepancies include columns in the source table being absent from the target table, and columns in the target table being absent from the source table.

In "case A" 204, the source table 200 and the target table 202 each possess corresponding columns $C_1$ and $C_2$. In this instance, then, there is no discrepancy between the schemas.

In "case B" 206, the source table 200 comprises a superset of the columns in the target table 202. The source table 200 comprises columns C1 and C2, while the target table comprises column C1 but not column C2. In an embodiment, an option to the ALTER TABLE APPEND expression may indicate that the extra column C2 should not be added to the target table 202.

In "case C" 208, the source table 200 comprises a subset of the columns in the target table 204. The depicted source table 200 comprises column C1. The depicted target table 202 comprises C1 as well as an additional column C2. In an embodiment, the ALTER TABLE APPEND expression may include an option that indicates that a default value or a null value should be used, for column C2, for rows appended from the source table 200.

In "case D" 210, the source table 200 comprises a superset of the columns of the target table 202. An option to the ALTER TABLE APPEND may indicate that the extra column C2 should be added to the target table 200. For rows appended to the target table 200, the values for the column C2 are obtained from the source table 200. In various embodiments, the values for column C2 for rows found in the source table 200 prior to the command may be filled with default or null values.

In "case E" 212, the schemas for the source table 200 and target table 202 are divergent in various respects. The depicted divergence is one example of a number of possible types of divergence or discrepancy between the source table 200 and target table 202. In such cases, the ALTER TABLE APPEND may be provided with one or more options to control how the target table is populated when discrepancies exist. Example of such options include options matching columns of different names or types, ignoring certain columns, providing default or null values for certain columns, and so on. For example, column $C_1$ in the source table 200 may be mapped to column $C_3$ in the target table 202, and column $C_2$ may be mapped to a new column $C_5$ in the target table 202. For rows copied from the source table 200, values for column $C_4$ (not found in the source table 200) might be populated with default values or null values.

Figure 3:
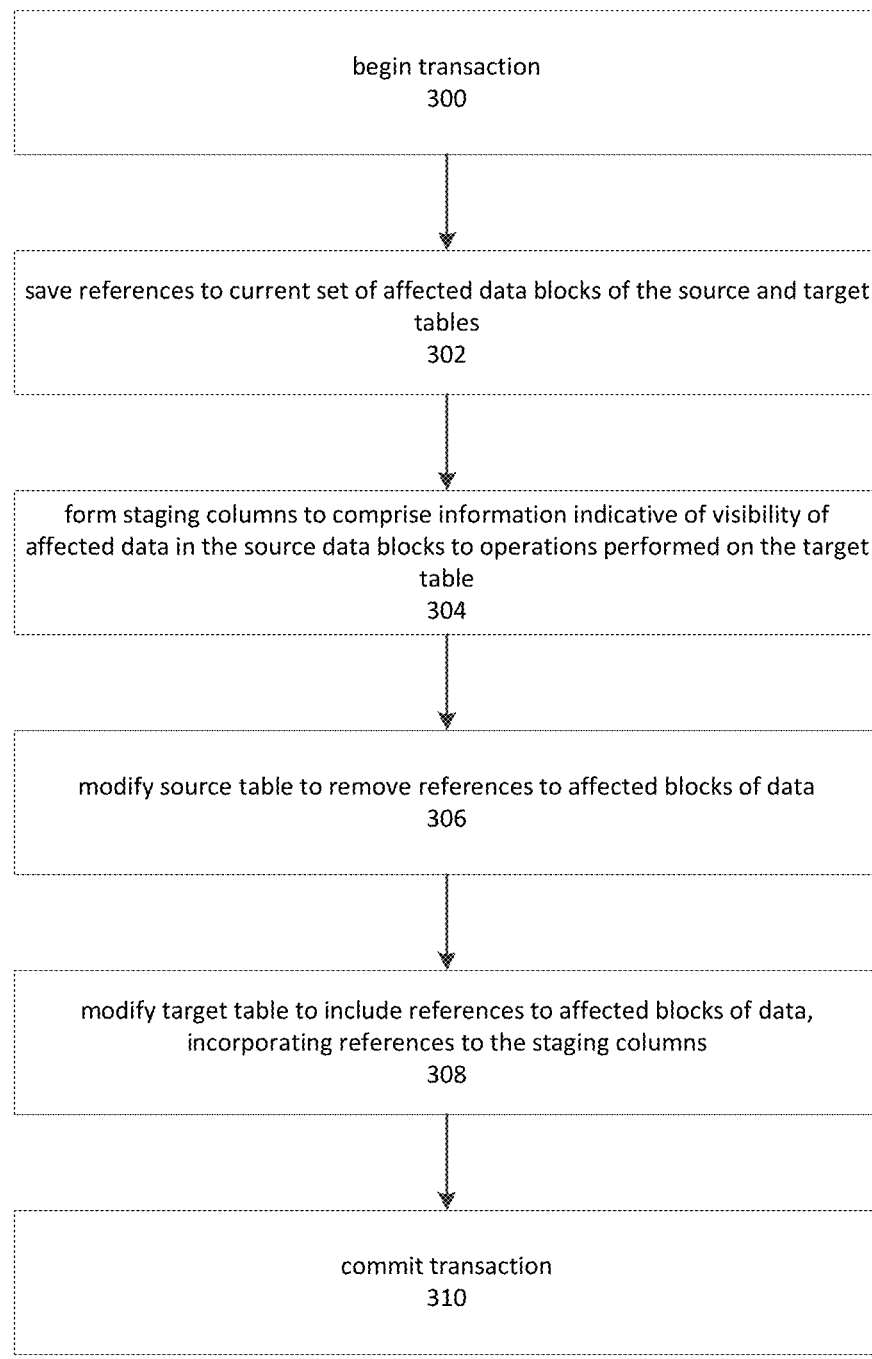
FIG. 3 is a flow diagram depicting an example process for performing a combined truncate and append operation.

FIG. 3 is a flow diagram depicting an example process for performing a combined truncate and append operation. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 300 depicts beginning a transaction. In one embodiment, the combined truncate and append operation may be executed in the context of a transaction, such that it and other commands executed within the transaction are all either successfully completed or have no lasting effect on the state of the database.

Block 302 depicts saving references to the current set of affected data blocks of both the source and target tables. In one embodiment, in a column-oriented database, the source table may include, for a column $C_1$, references to a collection of data blocks in which data for the column $C_1$ is stored. The target table may also include a corresponding column $C_1$, and include references to a corresponding collection of data blocks. As an initial step, the processing of the combined truncate and append operation may include preserving these references.

In one embodiment, the references comprise block identifiers. The database may, for each column in the source table, save the block identifiers for the first and last data blocks of the affected portion of the corresponding column. The database may also save the block identifiers of the first and last data blocks of each column in the target table. Note that the affected portion of the source table may refer to the data that is to be transferred from the source table to the target table and truncated from the source table. Typically, this would encompass all of the data in the source table, or all of the data for one or more of the columns of the table.

Block 304 depicts forming staging columns that may comprise information indicative of the visibility of the affected data in the source table operations performed on the target table. In one embodiment, access to data in the source and target tables is subject to concurrency control. In some instances, version control may be based on lock indicators associated with each row, or on version indicators (such as a transaction sequence identifier) associated with each row. The database may form the staging table to comprise a collection of such indicators. In an embodiment, the staging table comprises a column of indicators, in which each row of the column corresponds to an affected row in the source table and indicates whether or not that row of data would be visible or otherwise accessible to operations performed on the target table.

In one embodiment, transactions performed on a database table may be versioned, such that each operation on the table is assigned a sequence number. The staging table may be populated with a version number which corresponds to an "insert" operation on the target table. Operations on the target table that are associated with earlier version numbers may be denied access to the table, while operations associated with later version numbers may be permitted access. Note that this access may occur, in some instances, subsequent to operations 306 and 308, in which affected data blocks from the source table are transferred to the target table.

Block 306 depicts modifying the source table to remove references to the affected blocks of data. In one embodiment, the source table may include references to a list of data blocks for each column in the source table. These references may be removed from the source table. If not replaced with an alternative reference to another set of data blocks, that column of the source table is, in effect, truncated.

Block 308 depicts modifying the target table to include references to the affected blocks of data. In one embodiment, the target table may, prior to execution of the combined truncate and append operation, comprise references to a list of data blocks for each column of the target table. These references may be modified to include references to the data blocks previously referred to by the source table. This operation may have the effect of appending the list of source data blocks previously referred to by the source table to the list of data blocks referred to by the target table. Note that in some cases and embodiments, this may result in the source data being logically appended to the target data, although it might also, in some cases and embodiments, be perceived as a logical merge operation.

Block 308 also depicts that the source table may be further modified to include references to columns from the staging table. In one embodiment, if data blocks for a column $C_1$ are incorporated into the target table, corresponding blocks from the staging table may also be incorporated. Access to the corresponding rows in the target table may then be controlled using the information from the staging table. Further details may be found in FIGS. 4 and 5.

Block 310 depicts committing the transaction. In one embodiment, this may comprise permitting access to the affected data blocks to transactions sequenced after the combined truncate and append operation. Committing the transaction may also involve making the modifications made to the source and target tables permanent.

Figure 4:
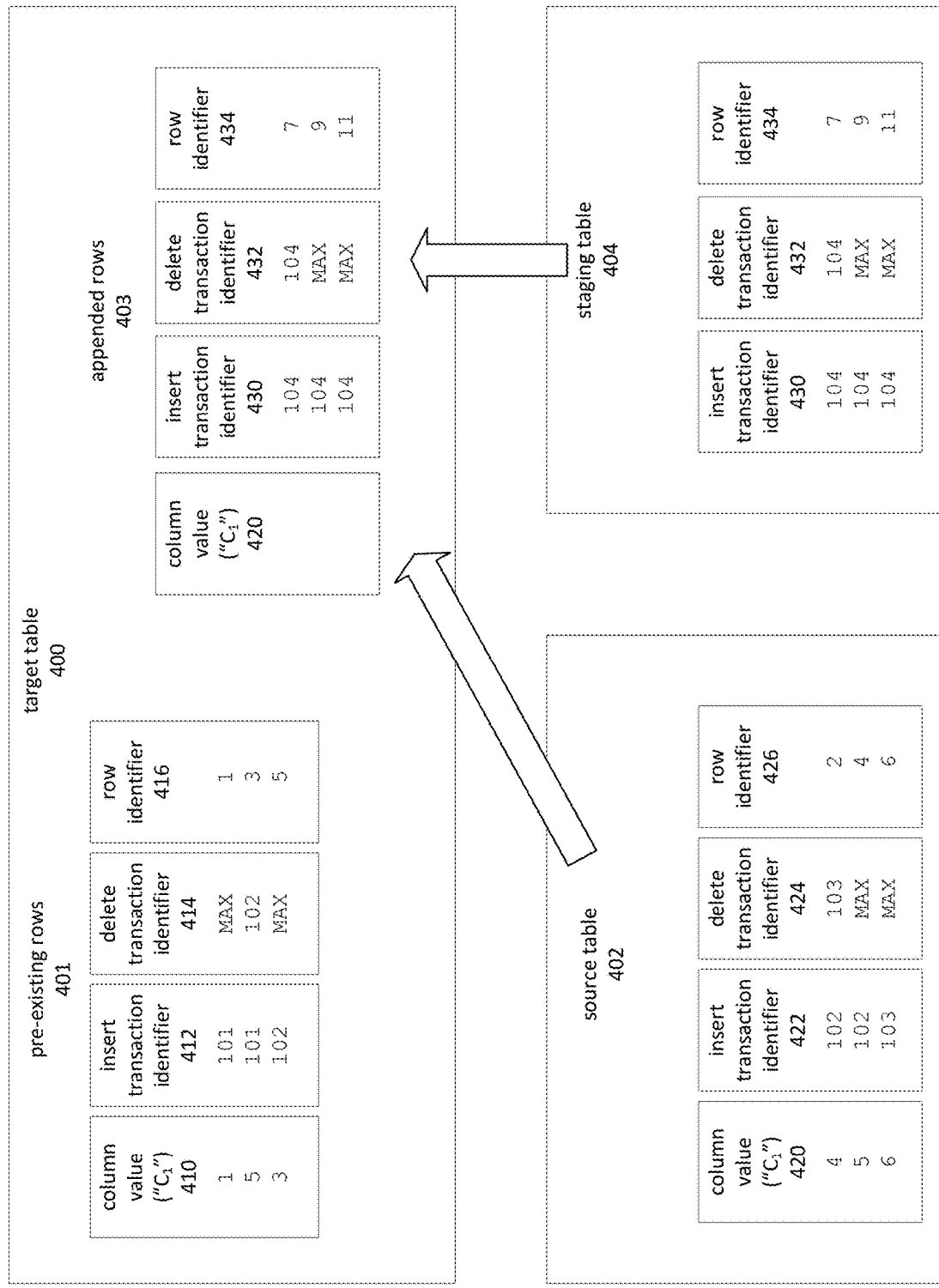
FIG. 4 is a block diagram depicting further aspects of a combined truncate and append operation.

FIG. 4 is a block diagram depicting further aspects of a combined truncate and append operation. The combined truncate and append operation may involve truncating column $C_1$ from the source table 402 and, in an unified operation, appending data for the column $C_1$ to the column $C_1$ of the target table 400.

In one embodiment, the source table may comprise column values 420, insert transaction identifiers 422, delete transaction identifiers 424, and row identifiers 426. The column values 420 may represent the data maintained by the table. For example, in the case depicted by FIG. 4, a command such as "select $C_1$ from <source table 402>" might upon execution return the values 4, 5, and 6. The insert transaction identifiers 412 might indicate the ordering of the transaction in which the corresponding column values 420 were inserted. For example, the value "5" might be associated with an insert transaction identifier of 102, while the value of "6" might be associated with an insert transaction identifier of 103. The value of "6" might therefore have been inserted into the source table 402 subsequently to the value "5." The delete transaction identifiers 424 may indicate the ordering of the transaction (if any) in which the corresponding column values 420 were deleted. For example, the value "4" in the column values 420 might have been deleted in transaction number "103," while the values "5" and "6" have not yet been deleted. A "MAX" indicator may, in some embodiments, indicate that the corresponding data value has not been deleted. It will be appreciated that the example of using "MAX" to indicate that a column value is provided for illustrative purposes, and should not be construed as limiting. The row identifiers 426 may, in some cases and embodiments, be used to uniquely identify a row. In the example of FIG. 4, the row identifier "2" might correspond to identify the row containing the column value "4," the insert transaction identifier "102", and the delete transaction identifier "103."

The target table 400 may comprise a similar set of columns for a set of pre-existing rows 401. The target table may refer to data blocks comprising column values 410, insert transaction identifiers 412, delete transaction identifiers 414, and row identifiers 416.

In one embodiment, the database may modify the source table 402 to remove references to the column values 420 that are to be truncated. The insert transaction identifiers 422, the delete transaction identifiers 424, and the row identifiers 426 may no longer be needed once the combined append and truncate operation is completed. Data blocks corresponding to the insert transaction identifiers 422, the delete transaction identifiers 424, and the row identifiers 426 may, in some embodiments, be marked for eventual deletion and reclaimed by a garbage collection process.

In one embodiment, data from the staging table 404 may be combined with the column values 420 and linked into the target table 400. As depicted in FIG. 4, the target table 400 may comprise, at the completion of the combined append and truncate operation, a set of appended rows 403 which comprises the column values 420 from the source table 402 and the insert transaction identifiers 430, delete transaction identifiers 432, and row identifiers 434.

Note that in the example of FIG. 4, the insert transaction identifiers 430, delete transaction identifiers 432, and row identifiers 434 represent data that is indicative of visibility or accessibility of data in the source table 402 to operations performed on the target table 400. The insert transaction identifiers 430 may be selected to represent an insert transaction on the target table 400. If a row in the source table 402 has been deleted, a delete transaction identifier 432 may be selected to show that the row has also been deleted during the same transaction. If a row has not been deleted, a "MAX" value or other indicator may be used.

Figure 5A:
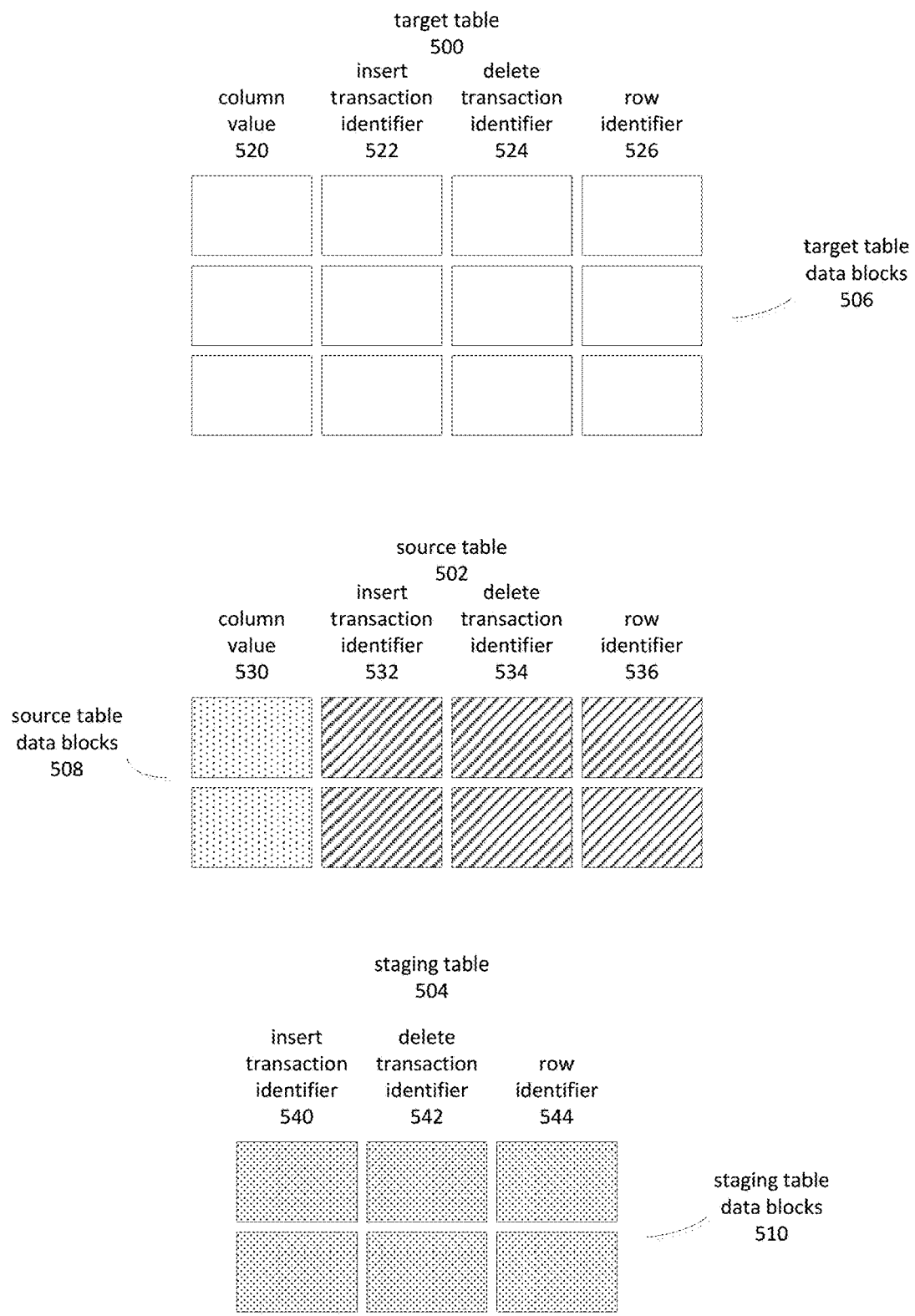
FIG. 5A is a block diagram depicting a target table, source table, and staging table prior to re-referencing data blocks.
Figure 5B:
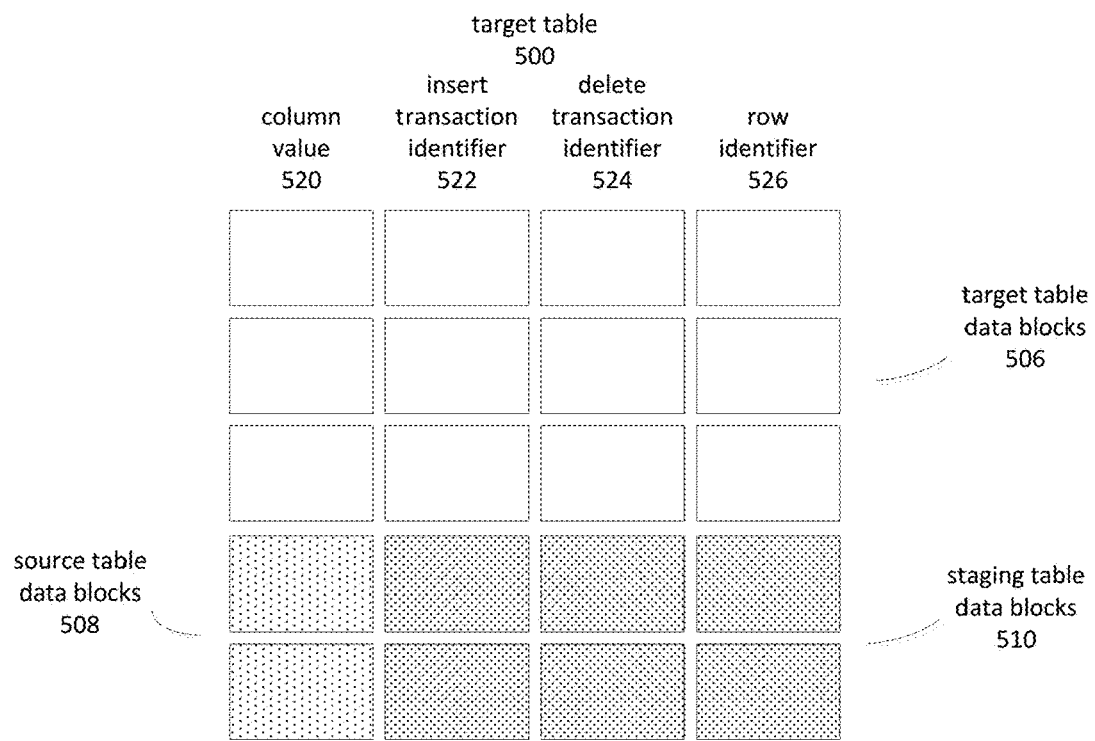
FIG. 5B is a block diagram depicting a target table subsequent to re-referencing data blocks.

FIGS. 5A and 5B depict further aspects of a combined truncate and append operation. FIG. 5A is a block diagram depicting a target table 500, source table 502, and staging table 504 prior to re-referencing data blocks.

The target table may initially comprise data blocks 506 corresponding to column values 520, insert transaction identifiers 522, delete transaction identifiers 524, and row identifiers 526. Similarly, the source table 502 may comprise data blocks 508 corresponding to column values 530, insert transaction identifiers 532, delete transaction identifiers 534, and row identifiers 536.

In one embodiment, during execution of a combined truncate and append operation, a staging table 504 may be created to comprise data blocks 510 corresponding to insert transaction identifiers 532, delete transaction identifiers 534, and row identifiers 536. The data blocks 510 of the staging table 504 may correspond to those of the column values 530 in the source table 502. Each row of insert transaction identifiers 540, delete transaction identifiers 542, and row identifiers 544 may correspond to a row in the column values 530 of the source table 502. Each row of the staging table 504 indicates, for a corresponding row in the source table, the visibility or accessibility of the row in operations performed on the target table 500. In various embodiments, the database may enable accessibility of this data, consistent with the information maintained in the staging table 504, once the target table 500 has been modified to incorporate the data blocks of the source table's column values 530 and the staging table's 504 insert transaction identifiers 540, delete transaction identifiers 542, and row identifiers 544.

FIG. 5B is a block diagram depicting a target table subsequent to re-referencing data blocks. The database may modify the source table 502 to delete references to the source table data blocks 508, and modify the target table 500 to include references to the source table data blocks 508, and the staging table data blocks 510.

In one embodiment, portions of the source table's data blocks 508 that are not incorporated into the target table 500 may be deleted once the combined truncate and append operation has been committed. In an embodiment, these data blocks are marked for deletion when the source table 502 is modified to exclude references to the source table's data blocks 508. Thus, the data blocks for the source table's 502 insert transaction identifiers 532, delete transaction identifiers 534, and row identifiers 536 may be marked for deletion and subsequently reclaimed for other use.

Figure 6A:
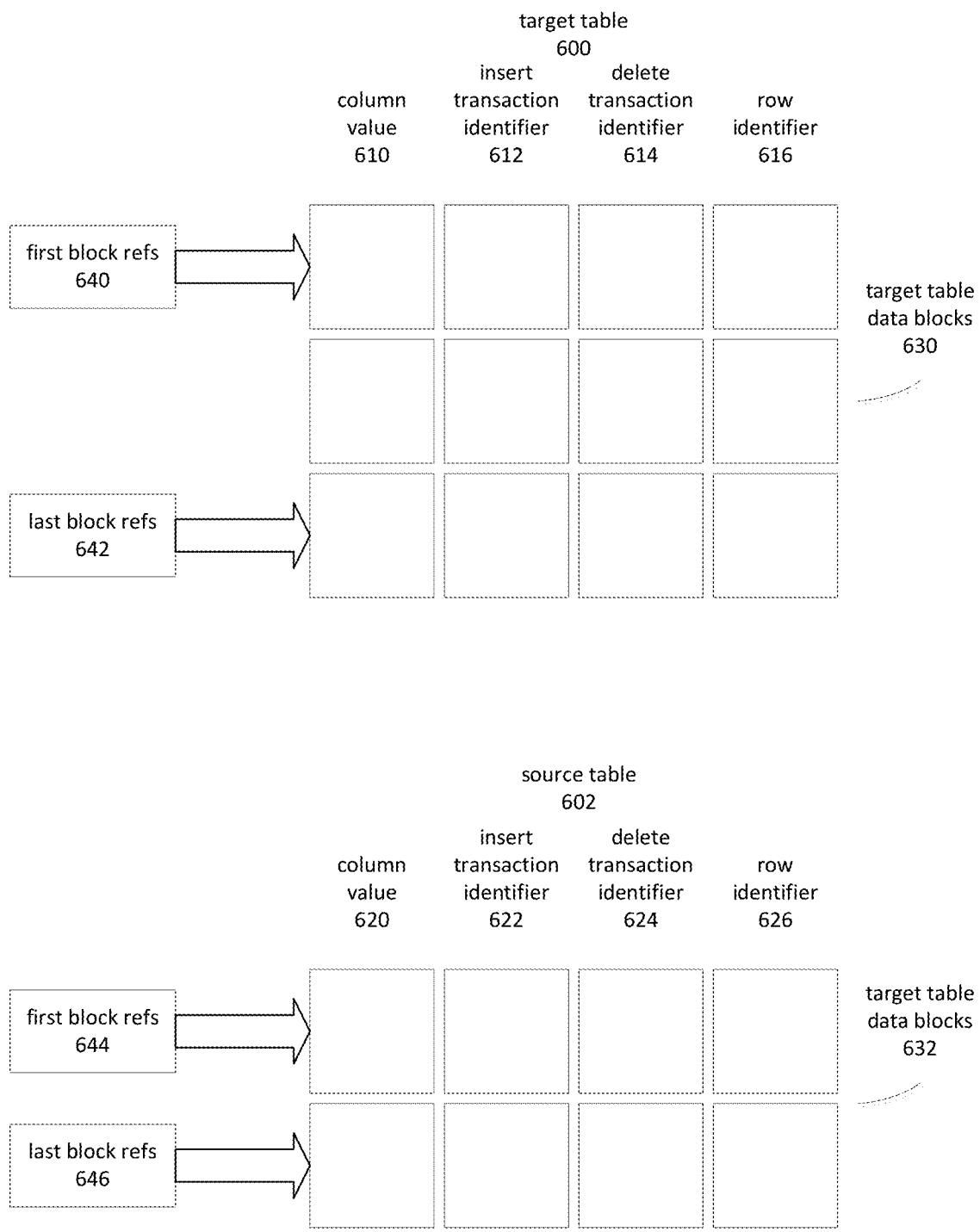
FIG. 6A is a block diagram depicting preservation of current block references.

FIG. 6A is a block diagram depicting preservation of current block references. In one embodiment, a combined truncate and append operation may be executed in the context of an explicit or implicit transaction. The combined truncate and append operation may, in various embodiments, be rolled back or cancelled. When executed in the context of a transaction in which other operations are performed, the effects of the truncate and append operation may be reversed along with any effects of the other operations. In various embodiments, support for rolling back or cancelling the effects of the combined truncate and append operation may include preserving references to a set of data blocks current as of the commencement of the combined truncate and append operation.

In one embodiment, a combined truncate and append operation may be execute to relocate data blocks from a source table 602 to a target table 600. As of the commencement of the combined truncate and append operation, a target table 600 might comprise various data blocks 630 for column values 610, insert transaction identifiers 612, delete transaction identifiers 614, and row identifiers 616. Similarly, a source table 602 might comprise various data blocks 632 for column values 620, insert transaction identifiers 622, delete transaction identifiers 624, and row identifiers 626.

In one embodiment, the data blocks 630 that are associated with the target table 600 may be ordered, in some fashion, from first to last. In some instances, newly added data may tend to be found in data blocks near the last data block, while older data may tend to be found in data blocks near the first data block. For example, as depicted in FIG. 6, the column values 610 may comprise three data blocks ordered from first to last. The data blocks 632 associated with the source table 602 may be similarly arranged.

In one embodiment, upon commencement of the combined truncate and append operation, the database may save first block references 640 and last block references 642 for the target table, and first blocks references 644 and last block references 646 for the source table 602. If the combined truncate and append operation (or a transaction in which the combined truncate and append operation is executed) should be cancelled or rolled back, the pre-existing first and last-block references may be used, by the database, to re-establish the prior state of the database.

In one embodiment, if a cancellation or rollback is requested, data blocks added subsequently to the commencement of the combined truncate and append operation may be removed from the system. This may, for example, include removing references to any data blocks outside of the preserved first and last block refs 640, 642 for the target table 600 and first and last block refs 644, 646 for the source table 602.

Other techniques may be used to preserve a snapshot of data blocks as of the commencement of the combined truncate and append operation. For example, in some instances a list, bitmap, or other structure may indicate which data blocks existed prior to execution of the combined truncate and append operation. A converse technique may also be used, in which a list, bitmap, or other structure is used to indicate which data blocks were added during processing of the truncate and append operation.

In one embodiment, operations executed in the context of a transaction, subsequent to the commencement of a combined truncate and append operation, may be applied to data blocks outside of those referred to by the preserved first and last block refs 640, 642 of the target table 600 and the first and last block refs 644, 646 of the source table 602. In the event of a cancellation or rollback, the data blocks outside of this range may be discarded and, consequently, the effects of the operation(s) negated.

Figure 6B:
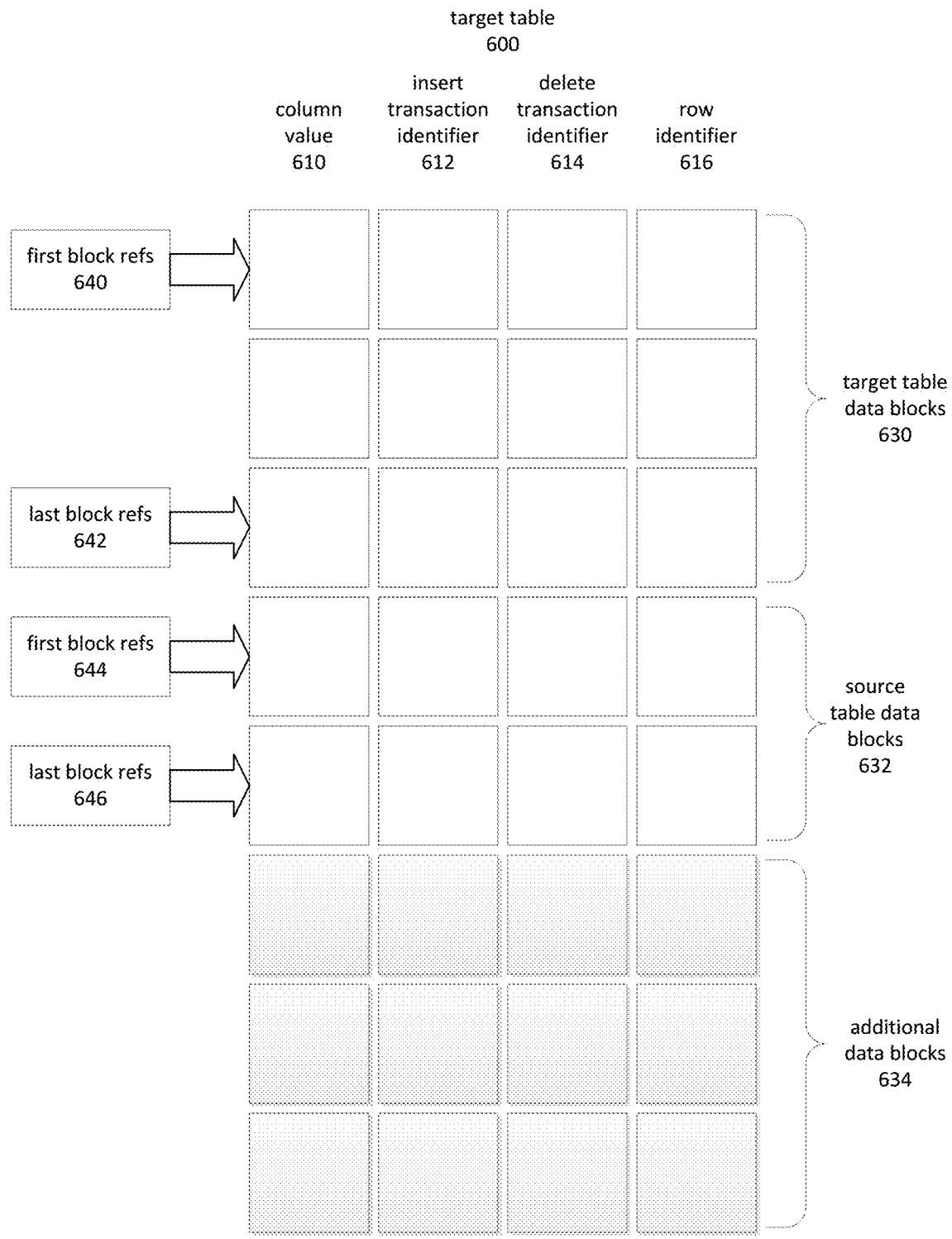
FIG. 6B is a block diagram depicting preserved block references in a target table.

FIG. 6B is a block diagram depicting preserved block references in a target table. The target table 600 may, after the combined truncate and append operation, include the original target table data blocks 630 and the appended source table data blocks 632. Additional data blocks 634 may have also been added after the appended source table data blocks 632. The additional data blocks 634 may have been added in the context of the transaction in which the combined truncate and append operation was executed.

In one embodiment, references 640, 642 to the first and last blocks of the target table data blocks 630 may be preserved after the combined truncate and append operation has completed and while the transaction in which the combined operation was executed is still in progress. Similarly, the references 644, 646 to the first and last blocks of the source table data blocks 632 may also be preserved while the transaction is in progress.

In one embodiment, changes to data in the target table 600 may be limited to the additional data blocks 634 while the transaction is in progress. For example, in an embodiment changes may be limited to data blocks following the last of the appended source table data blocks 632, as indicated by the preserved reference 646. In another embodiment, changes to data in the target table 600 may be limited to data blocks subsequent to the last of the target table data blocks 630, as indicated by the preserved reference 642.

In one embodiment, if the transaction is rolled back, cancelled, or otherwise aborted, the preserved references 640-646 may be used to restore the state of the database prior to the transaction. The target table 600 may be modified to exclude reference to data blocks not encompassed by the references 640, 642 to the original target table data blocks 630. The references to the source table data blocks 632 may thus be removed from the target table 600 and restored to the source table 602. The references may be located using the preserved references 644, 646 to what were originally the first and last data blocks 632 of the source table 602. The additional data blocks 634 may be discarded.

Figure 7:
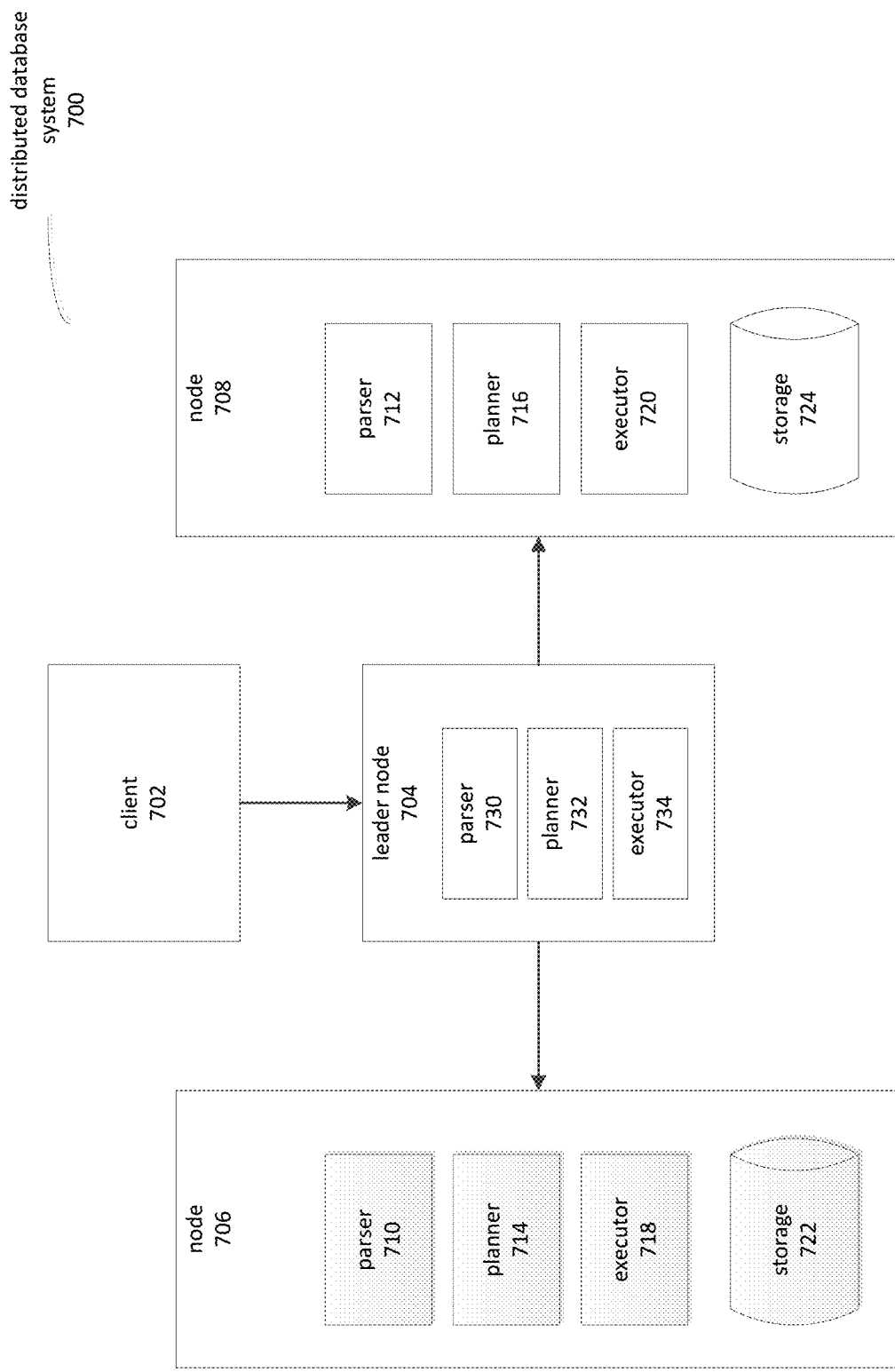
FIG. 7 is a block diagram depicting an example of a distributed database system 700 on which aspects of the present invention may be practiced.

FIG. 7 is a block diagram depicting an example of a distributed database system 700 on which aspects of the present invention may be practiced. In one embodiment, a client 702 may issue commands to a leader node 704. The client 702 may, for example, issue an ALTER TABLE APPEND command as an expression in a query language, such as SQL. The client 702 may include the ALTER TABLE APPEND command in the context of a transaction, and may also issue other commands in the context of the same transaction. For example, a transaction might comprise an ALTER TABLE APPEND command accompanied by additional INSERT or DELETE commands.

In one embodiment, the leader node 704 may coordinate execution of commands sent by the client 702. In some instances, each node 706, 708 may comprise a partition or slice of a database table. The leader node 704 may, in such cases, coordinate execution of a command such that both nodes 706, 708 participate in executing the command and/or forming a result.

In one embodiment, the nodes 706, 708 may operate as independent databases. Each node 706, 708 may contain a parser 710, 712, planner 714, 716, and executor 718, 720. Each node 706, 708 may also contain a storage device 722, 724. The nodes 706, 708 may include physical computing nodes and virtual computing nodes combined with an underlying physical computing device.

In one embodiment, a parser 710, 712 may receive textual expressions of commands to be performed on the table(s) maintained by the distributed database system 700. Conventional parsing algorithms may be employed to scan the textual expressions, identify query language elements, and apply a grammar to the identified elements. The parsing may thus result in a translation from the textual expression to some other representation of a command.

In one embodiment, a planner 714, 716 may determine a plan for executing a command on the corresponding node 706, 708. In general, plan determination may comprise identifying a series of steps by which a command may be executed. In the case of an ALTER TABLE APPEND command, or similar combined truncate and append operation, plan determination may comprise comparing source and target tables to identify schema discrepancies, locating blocks of data specified by the command, and so forth. The plan may, in some instances, include steps for updating tables to remove references to data blocks or to add references to data blocks.

In one embodiment, an executor 718, 720 may execute the plan devised by the planner 714, 716. In the case of an ALTER TABLE APPEND command, or similar combined truncate and append operation, this may comprise forming a staging table, removing references to affected data blocks in the source table, adding references to affected data blocks to the target table, and merging the affected data blocks with columns from the staging table.

In one embodiment, the planner 714, 716 and executor 718, 720 may similarly process other commands, including commands to revert the effects of a pending transaction that includes one or more combined truncate and append operations.

In one embodiment, the leader node 704 may comprise a parser 730, planner 732, and/or executor 734. These may take the place of the parser 710, 712, planner 714, 716, and/or executor 718, 720 of the nodes 706, 708. In an embodiment, the leader node 704 may include a parser 730 and planner 732, and the nodes 706, 608 may comprise an executor 718, 720.

Figure 8:
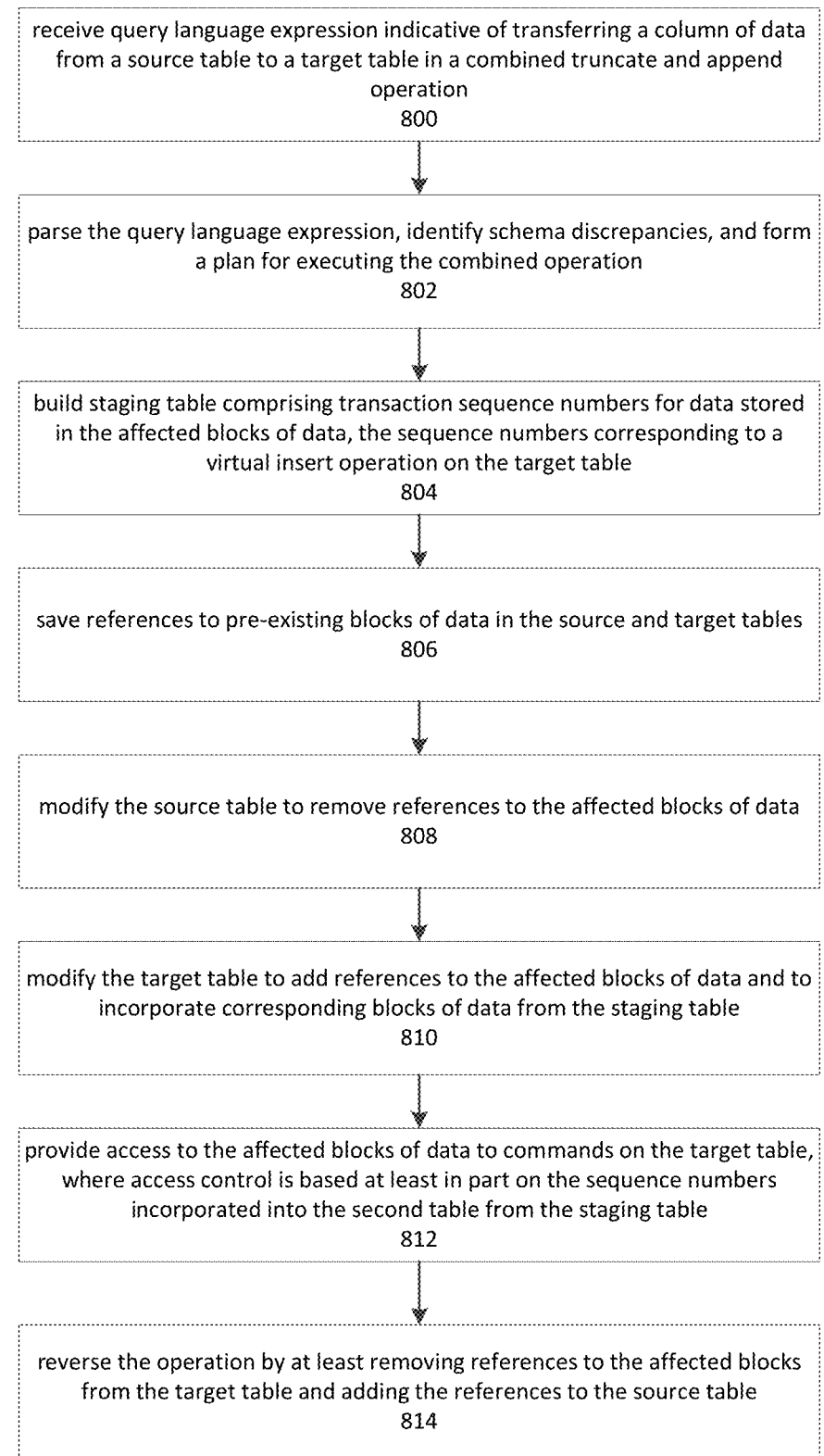
FIG. 8 is a flow diagram depicting an example process of performing a combined truncate and append operation.

FIG. 8 is a flow diagram depicting an example process of performing a combined truncate and append operation. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 800 depicts receiving a query language expression that is indicative of transferring a column of data from a source table to a target table, in a combined append and truncate operation. In one embodiment, the query language expression may, for example, be a SQL expression provided to the database as textual data. The query language expression may be sent by a client device and received by the database via a call-level interface or protocol, such as Open Database Connectivity ("ODBC") interface. The query language expression may include options for handling schema discrepancies, such as those depicted in FIG. 2. The query language expression might also be associated with a transaction expression. The association may, for example, include being nested as a subexpression in a BEGIN TRANSACTION . . . END TRANSACTION statement. In such instances, additional DML commands may also be associated with the transaction, and may be committed or rolled-back along with the combined truncate and append operation.

Block 802 depicts parsing the query language expression to identify the source table, target table, affected columns, and various options. In one embodiment, a parser and/or lexical analysis component of a database may be configured to recognize the query language expression. Block 802 further depicts forming a plan for executing the combined operation. This may involve identifying which blocks of the source table are affected by the command. A query planner component of a database may be configured to analyze and locate affected data blocks, identify references that are to be reassigned, and assess whether or not the combined truncate and append operation may be completed without copying of the data blocks. In some instances, the combined operation may be executed in view of an option to fail if copying of data blocks is required, or if more than a threshold quantity of data must be copied to complete the combined truncate and append operation.

Block 804 depicts building a staging table that comprises transaction sequence numbers for data stored in the affected blocks of data. The transaction sequence number may, in some embodiments, correspond to a virtual insert operation on the target table. Thus, the staging table may comprise a column of sequence number data indicative of a transaction in which the data from the source table was inserted into the target table. The staging table may comprise additional columns corresponding to other information, such as row identifiers or the sequence numbers of transaction in which data was deleted from the source table. Note that deleted data is still appended to the target table, and may be visible to transaction on the target table prior to the deleting transaction.

Block 806 depicts saving references to pre-existing blocks of data in the source and target tables. In one embodiment, this may comprise saving references to the last-ordered block of column data associated with the source and target tables. During a transaction comprising the combined truncate and append operation, modifications may be restricted to data blocks subsequent to these blocks. For example, a request to modify data in the target table might result in the addition of a new block of data to a list of column data referred to by the source table. The data in this list might be modified based on the request. If the transaction is subsequently cancelled or rolled-back, this block of column data may be deleted, along with all other blocks added to the second table during the transaction. Some blocks, i.e. those initially associated with the source table, may be reassigned back to the source table upon rollback or cancellation of the transaction.

Block 808 depicts modifying the source table to remove references to the affected blocks of data. In one embodiment, this may cause the table to be wholly or partially truncated, since by removing the references the corresponding blocks of column data are excluded from the source table.

Block 810 depicting modifying the target table to add references to the affected blocks of data, and to incorporate corresponding blocks of data from the staging table. In one embodiment, the target table may therefore, after block 810, comprise references to both the column data from the source table as well as column data for the staging table. As noted, the rows of the column data from the source table may correspond to the rows of the column data for the incorporated staging table.

Block 812 depicts providing access to the affected blocks of data. In one embodiment, the access may be provided to operations in a transaction context for which the affected blocks of data are visible. For example, the data may be visible to operations in a transaction context that is the same as, is based on, or follows the combined truncate and append operation. Ordering of transaction may be determined by sequence numbers. For example, each transaction may be assigned a sequence number that monotonically increases with each initiated transaction. The database may determine to provide access to column data from the source table by checking a corresponding row in the data from the staging table. If the access is associated with a sequence number that is equal to or greater than the sequence number, then the database may permit the access.

Block 814 depicts reversing the operation by at least removing references to the affected blocks of data from the target table, and adding the references back to the source table. In one embodiment, the reversing operation may be performed in response to a rollback or cancellation of a transaction in which the combined truncate and append operation was executed.

Figure 9:
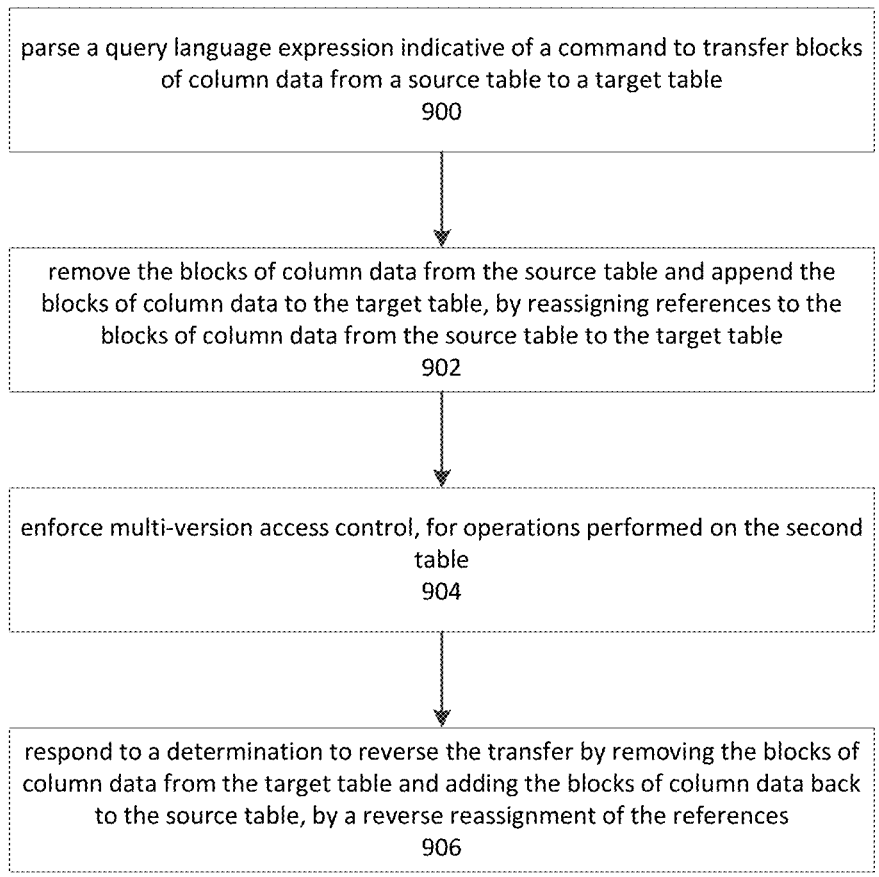
FIG. 9 is a flow diagram depicting aspects of a system performing a combined truncate and append operation.

FIG. 9 is a flow diagram depicting aspects of a system performing a combined truncate and append operation. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 900 depicts parsing a query language expression indicative of a command to transfer blocks of column data from a source table to a target table. In one embodiment, the expression may be an ALTER TABLE APPEND expression as described herein. The expression may, in some cases, be associated with a transaction expression. For example, the ALTER TABLE APPEND expression might be included as a sub-expression of a BEGIN TRANSACTION . . . COMMIT TRANSACTION expression.

Parsing the expression, as described herein, may involve identifying query language tokens and identifiers in the text of an expression, applying a grammar to the identified tokens and identifiers, and forming, in the memory of a computing device, a tree structure indicative of the expression. In one embodiment, a parser of a database node, for example as depicted in FIG. 7, may perform the parsing of the expression.

Block 902 depicts responding to the command by removing the blocks of column data from the source table and appending the blocks of column data to the target table. In one embodiment, removing an appending may comprise reassigning references to the blocks of column data from the source table to the target table, thus avoiding copying of the underlying data. A reference to the blocks of column data may be removed from the source table, and added to the target table. In one embodiment, an executor of a database node, for example as depicted in FIG. 7, may perform the operations depicted by block 904.

In one embodiment, the blocks of column data may be structured or represented as a list. For example, in some cases each block of column data might comprise a reference to the next block. In other cases, a structure might contain an ordered list of references to data blocks. The addition and removal of these references, i.e. their reassignment, thus refers to altering the corresponding structure to include or exclude a reference as appropriate, thus modifying the table to include or exclude the corresponding block of column data.

Block 904 depicts enforcing multi-versioned access control for operations performed on the second table. In one embodiment, the data may be made visible to operations occurring in the same transaction, and to other transactions subsequent to the transactions being committed. In one embodiment, the executor of a database node may perform the operations depicted by block 904.

Block 906 depicts responding to a determination to reverse the transfer by removing the blocks of column data from the target table and adding the blocks of column data back to the source table. In one embodiment, determination to reverse the transfer may be based on a system failure occurring during the transfer or during another operation in the same transaction. The determination may, in some instances, be based on a command to cancel or rollback the transfer or an associated transaction. In one embodiment, the executor of a database node may perform the operations depicted by block 906.

Figure 10:
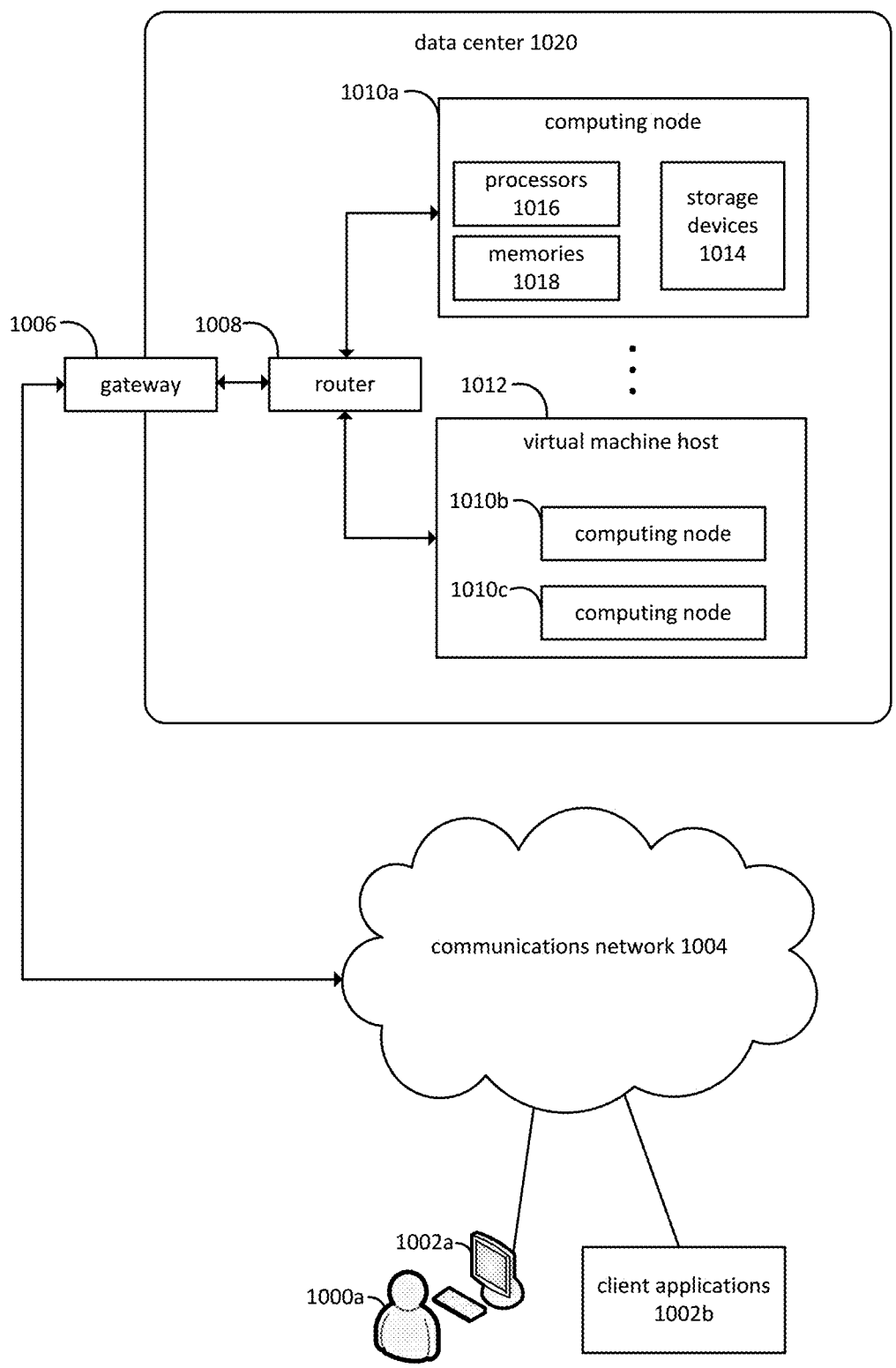
FIG. 10 is a block diagram depicting an embodiment of a computing environment in which aspects of the present disclosure may be practiced.

FIG. 10 is a diagram depicting an example of a distributed computing environment on which aspects of the present invention may be practiced. In an embodiment, various users 1000a may interact with various client applications, operating on any type of computing device 1002a, to communicate over communications network 1104 with processes executing on various computing nodes 1010a, 1010b, and 1010c within a data center 1020. Alternatively, client applications 1002b may communicate without user intervention. Communications network 1004 may comprise any combination of communications technology, including the Internet, wired and wireless local area networks, fiber optic networks, satellite communications, and so forth. Any number of networking protocols may be employed.

In one embodiment, communication with processes executing on the computing nodes 1010a, 1010b, and 1010c, operating within data center 1020, may be provided via gateway 1006 and router 1008. Numerous other network configurations may also be employed. Although not explicitly depicted in FIG. 10, various authentication mechanisms, web service layers, business objects, or other intermediate layers may be provided to mediate communication with the processes executing on computing nodes 1010*a*, 1010*b*, and 1010*c*. Some of these intermediate layers may themselves comprise processes executing on one or more of the computing nodes. Computing nodes 1010*a*, 1010*b*, and 1010*c*, and processes executing thereon, may also communicate with each other via router 1008. Alternatively, separate communication paths may be employed. In some embodiments, data center 1020 may be configured to communicate with additional data centers, such that the computing nodes and processes executing thereon may communicate with computing nodes and processes operating within other data centers.

Computing node 1010*a* is depicted as residing on physical hardware comprising one or more processors 1016, one or more memories 1018, and one or more storage devices 1014. Processes on computing node 1010*a* may execute in conjunction with an operating system or alternatively may execute as a bare-metal process that directly interacts with physical resources, such as processors 1016, memories 1018, or storage devices 1014.

Computing nodes 1010*b* and 1010*c* are depicted as operating on virtual machine host 1012, which may provide shared access to various physical resources, such as physical processors, memory, and storage devices. Any number of virtualization mechanisms might be employed to host the computing nodes.

In one embodiment, the various computing nodes depicted in FIG. 10 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 11:
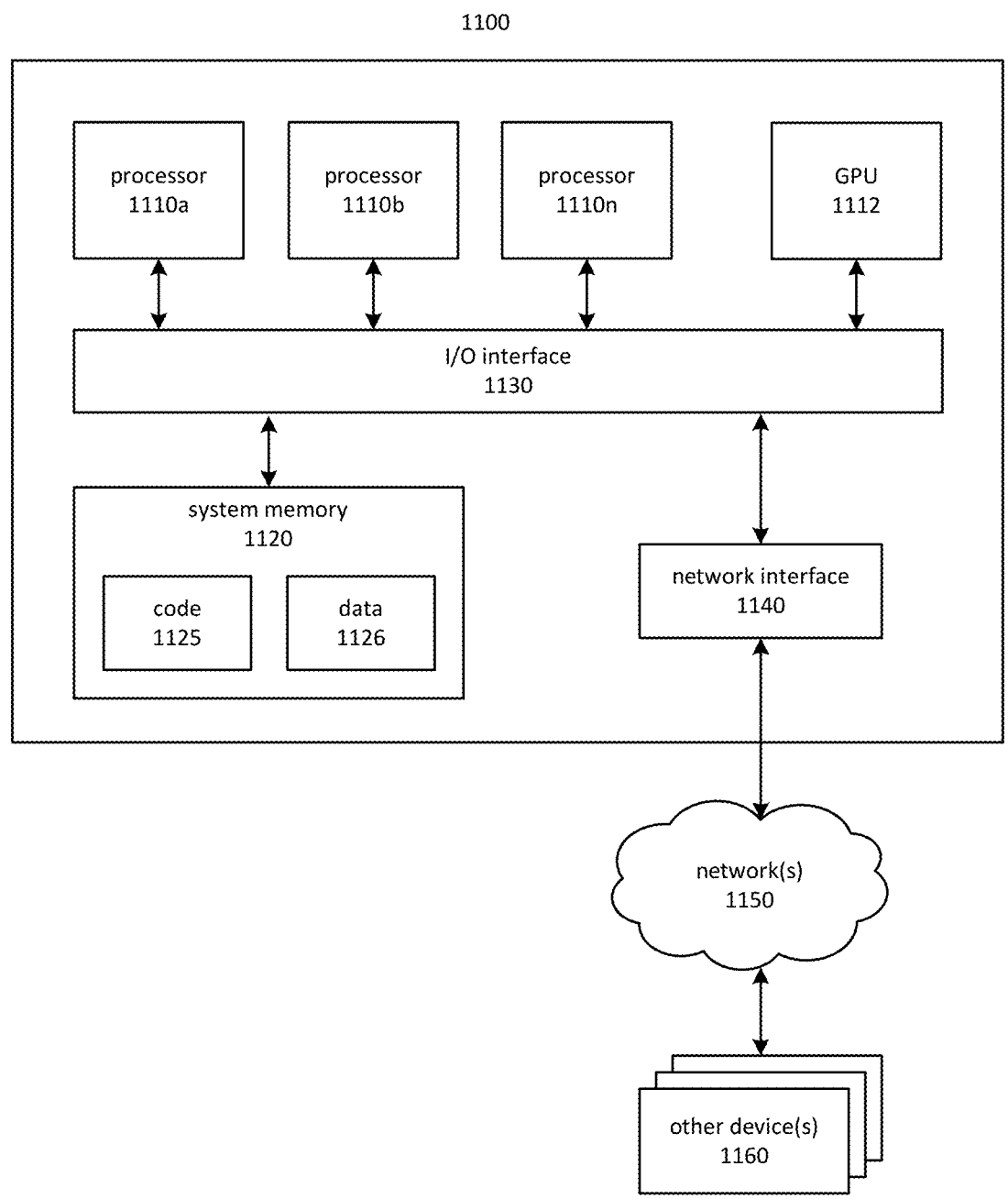
FIG. 11 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 11 depicts a general-purpose computer system that includes or is configured to access one or more computer-accessible media. In the illustrated embodiment, computing device 1100 includes one or more processors 1110*a*, 1110*b*, and/or 1110*n* (which may be referred herein singularly as a processor 1110 or in the plural as the processors 1110) coupled to a system memory 1120 via an input/output ("I/O") interface 1130. Computing device 1100 further includes a network interface 1140 coupled to I/O interface 1130.

In one embodiment, computing device 1100 may be a uniprocessor system including one processor 1110 or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1110 may commonly, but not necessarily, implement the same ISA.

In one embodiment, a graphics processing unit ("GPU") 1112 may participate in providing graphics rendering and/or physics processing capabilities. A GPU may, for example, comprise a highly parallelized processor architecture specialized for graphical computations. In some embodiments, processors 1110 and GPU 1112 may be implemented as one or more of the same type of device.

In one embodiment, system memory 1120 may be configured to store instructions and data accessible by processor(s) 1110. In various embodiments, system memory 1120 may be implemented using any suitable memory technology, such as static random access memory ("SRAM"), synchronous dynamic RAM ("SDRAM"), non-volatile/Flash®-type memory, or any other type of memory. In the illustrated embodiment, program instructions and data implementing one or more desired functions, such as those methods, techniques, and data described above, are shown stored within system memory 1120 as code 1125 and data 1126.

In one embodiment, I/O interface 1130 may be configured to coordinate I/O traffic between processor 1110, system memory 1120, and any peripherals in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect ("PCI") bus standard or the Universal Serial Bus ("USB") standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1010.

In one embodiment, network interface 1140 may be configured to allow data to be exchanged between computing device 1100 and other device or devices 1160 attached to a network or networks 1150, such as other computer systems or devices, for example. In various embodiments, network interface 1140 may support communication via any suitable wired or wireless general data networks, such as types of Ethernet networks, for example. Additionally, network interface 1140 may support communication via telecommunications/telephony networks, such as analog voice networks or digital fiber communications networks, via storage area networks, such as Fibre Channel SANs (storage area networks), or via any other suitable type of network and/or protocol.

In one embodiment, system memory 1120 may be a computer-accessible medium configured to store program instructions and data as described above for implementing embodiments of the corresponding methods and apparatus.

However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1100 via I/O interface 1130. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1100 as system memory 1120 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A database system, comprising:
   a parser that parses a query language expression indicative of transferring at least one block of column data from a first table to a second table, wherein the parser forms a structure indicative of the expression in a memory of a computing device and the at least one block of column data, the first table, and the second table are stored on one or more storage devices of one or more database nodes; and
   an executor that at least:
      removes a reference to the at least one block of column data from the first table;
      adds the reference to the at least one block of column data to the second table; and
      removes the reference to the at least one block of column data from the second table and adds the reference to the at least one block of column data to the first table, based at least in part on a determination to reverse the transferring.

2. The database system of claim 1, wherein the query language expression comprises an option indicative of handling a discrepancy between a first schema of the first table and a second schema of the second table.

3. The database system of claim 1, wherein the executor at least:
   stores an additional at least one block of column data, the additional at least one block of data comprising sequence numbers indicative of a transaction for inserting data in the at least one block of column data into the second table.

4. The database system of claim 3, wherein the executor at least:
adds an additional reference to the additional at least one block of column data to the second table; and
determines to provide visibility to data in the at least one block of column data to an operation on the second table, based at least in part on data in the additional at least one block of column data.

5. The database system of claim 1, wherein the executor at least:
adds a second block of column data to the at least one block of column data referenced by the second table;
modifies data in the second block of column data; and
deletes the second block of column data based at least in part on the determination to reverse the transferring.

6. A method, comprising:
removing a reference to at least one block of column data from a first table of a database;
adding the reference to a second table of the database, wherein the at least one block of column data, the first table, and the second table are stored on one or more storage devices of one or more database nodes; and
removing the reference from the second table and adding the reference to the first table, based at least in part on a determination to cancel a transfer of the at least one block of column data.

7. The method of claim 6, further comprising:
storing an additional at least one block of column data comprising sequence numbers;
adding an additional reference to the additional at least one block of column data to the second table; and
determining to provide access to data in the at least one block of column data based at least in part on the sequence numbers.

8. The method of claim 7, wherein the sequence numbers are indicative of an order of at least one of inserting or deleting data in the at least one block of column data into the second table, the order relative to other operations performed on the second table.

9. The method of claim 7, wherein the sequence numbers are indicative of a transaction inserting data in the at least one block of column data into the second table.

10. The method of claim 6, further comprising:
receiving a query language expression indicative of truncating column data from the first table and appending column data to the second table.

11. The method of claim 10, wherein the query language expression comprises an option indicative of handling a discrepancy between a first schema of the first table and a second schema of the second table, the discrepancy comprising at least one of a column in the first table being absent from the second table or a column in the second table being absent from the first table.

12. The method of claim 10, wherein the query language expression is associated with a transaction expression.

13. The method of claim 6, further comprising:
determining to reverse changes made to the second table in a transaction comprising a plurality of operations on the second table; and
removing references to the at least one block of column data and at least one additional block of column data that was added to the second table during the transaction.

14. The method of claim 6, further comprising:
storing an additional block of column data corresponding to a column of the first table; and
storing a default value for a row of the column in the additional block of column data.

15. The method of claim 6, further comprising:
adding the reference to the second table by at least modifying an additional block of column data associated with the second table to refer to the at least one block of column data; and
modifying a block of column data that follows the at least one block of column data, based at least in part on an additional request to modify the second table.

16. A database system, comprising:
one or more processors;
a storage device comprising a first table and a second table; and
one or more memories comprising instructions that, when executed by the one or more processors, cause the system at least to:
remove references to at least one block of column data associated with the first table;
add the references to the at least one block of column data to the second table, wherein the column data is transferred from the first table to the second table;
remove the references to the at least one block of column data from the second table; and
add the references to the at least one block of column data to the first table, wherein the transfer of the column data is reversed.

17. The system of claim 16, wherein the one or more memories have stored thereon further instructions that, when executed by the one or more processors, cause the system at least to:
parse a query language expression indicative of truncating column data from the first table and appending the column data to the second table.

18. The system of claim 17, wherein the query language expression comprises an option indicative of handling a discrepancy between a first schema of the first table and a second schema of the second table.

19. The system of claim 16, wherein the one or more memories have stored thereon further instructions that, when executed by the one or more processors, cause the system at least to:
store, on the storage device, an additional at least one block of column data comprising sequence numbers of a transaction inserting data in the at least one block of column data into the second table; and
add additional references to the additional at least one block of column data to the second table.

20. The system of claim 16, wherein the one or more memories have stored thereon further instructions that, when executed by the one or more processors, cause the system at least to:
save a reference to a block of column data ordered last in blocks of column data that were associated with the second table prior to the transferring; and
remove, from the second table, blocks of column data that follow the block of column data indicated by the saved reference.

* * * * *